United States Patent [19]

Mocker et al.

[11] Patent Number: 5,394,238

[45] Date of Patent: Feb. 28, 1995

[54] LOOK-AHEAD WINDSHEAR DETECTOR BY FILTERED RAYLEIGH AND/OR AEROSOL SCATTERED LIGHT

[75] Inventors: Hans W. Mocker, Minneapolis; Scott A. Nelson, Eagen; John F. Ready, Edina; Thomas J. Wagener, Eden Prairie, all of Minn.

[73] Assignee: Honeywell Inc., Minneapolis, Minn.

[21] Appl. No.: 973,482

[22] Filed: Nov. 9, 1992

[51] Int. Cl.$^6$ .............................................. G01B 9/02
[52] U.S. Cl. .................................. 356/342; 356/350; 372/94; 372/109
[58] Field of Search ............................. 372/3–5, 372/92, 93, 94, 109; 356/337, 338, 342, 345, 346, 350

[56] References Cited

U.S. PATENT DOCUMENTS

| | | | |
|---|---|---|---|
| 3,856,402 | 12/1974 | Low et al. | 356/342 X |
| 4,195,931 | 4/1980 | Hara | 356/346 |
| 4,359,640 | 11/1982 | Geiger | 356/342 X |
| 4,585,341 | 4/1986 | Woodfield | 356/342 X |
| 5,099,486 | 3/1992 | Acharekar et al. | 372/32 |
| 5,132,976 | 7/1992 | Chung et al. | 372/6 |
| 5,134,620 | 7/1992 | Huber | 372/6 |

OTHER PUBLICATIONS

"Performance Study of an Acousto-Optic Frequency Shifter in a $CO_2$ Laser Velocimeter" by W. R. M. Pomeroy et al., J. Phys. E:Sci. Instrum., vol. 13, 1980, Printed in Great Britain, pp. 982–985.

"Full-Scale Wake Flow Measurements with a Mobile Laser Doppler Velocimeter" by D. J. Wilson et al., J. Aircraft, vol. 16, No. 3, Mar. 1979, pp. 155–161.

"Confocal LDV Utilizing a Decoupling Beam Splitter Combiner" by D. K. Kreid et al., Applied Optics, Letters to the Editor, vol. 15, No. 1, Jan. 1976, pp. 14–16.

"Accurate and Compact Solid-State Doppler Velocimeters" by H. W. Mocker et al. *IRIS Specialty Group on Active Systems, Silver Springs, MD.;* Oct. 16–18, 1990, 12 pp.

"High Accuracy Laser Doppler Velocimeter Using Stable Long-Wavelength Semiconductor Lasers" by H. W. Mocker et al., Applied Optics, vol. 28, No. 22, Nov. 1989. pp. 4914–4919.

"Edge Technique: Theory and Application to the Lidar Measurement of Atmospheric Wind" by C. L. Korb et al., Applied Optics vol. 31, No. 21 Jul. 20, 1992 pp. 4202–4213.

"Eye-safe Coherent Laser Radar System at 2.1 $\mu$m using Tm,Ho:YAG Lasers," by S. W. Henderson et al., Optics Letters, May 1991, vol. 16, No. 10, pp. 773–775.

"Atmospheric Laser Doppler Velocimetry: an Overview" by J. W. Bilbro, Optical Engineering, Jul. 8, 1980, vol. 19, No. 4, pp. 533–542.

*Primary Examiner*—John D. Lee
*Attorney, Agent, or Firm*—John G. Shudy, Jr.

[57] ABSTRACT

Windshear detector using Rayleigh-backscattered light and a molecular filter for optical discrimination, and frequency locking of a laser, to detect windshear. The windshear detector has a pulsed ring laser that transmits a signal out of the detector and receives reflected backscatter of the transmitted signal. The ring laser is driven with an injection laser. Both lasers are ultimately keyed to the molecular transmission or absorption filter with locking electronics. The received reflected backscatter is detected and processed into a signal that indicates whether there is windshear or turbulence.

17 Claims, 8 Drawing Sheets

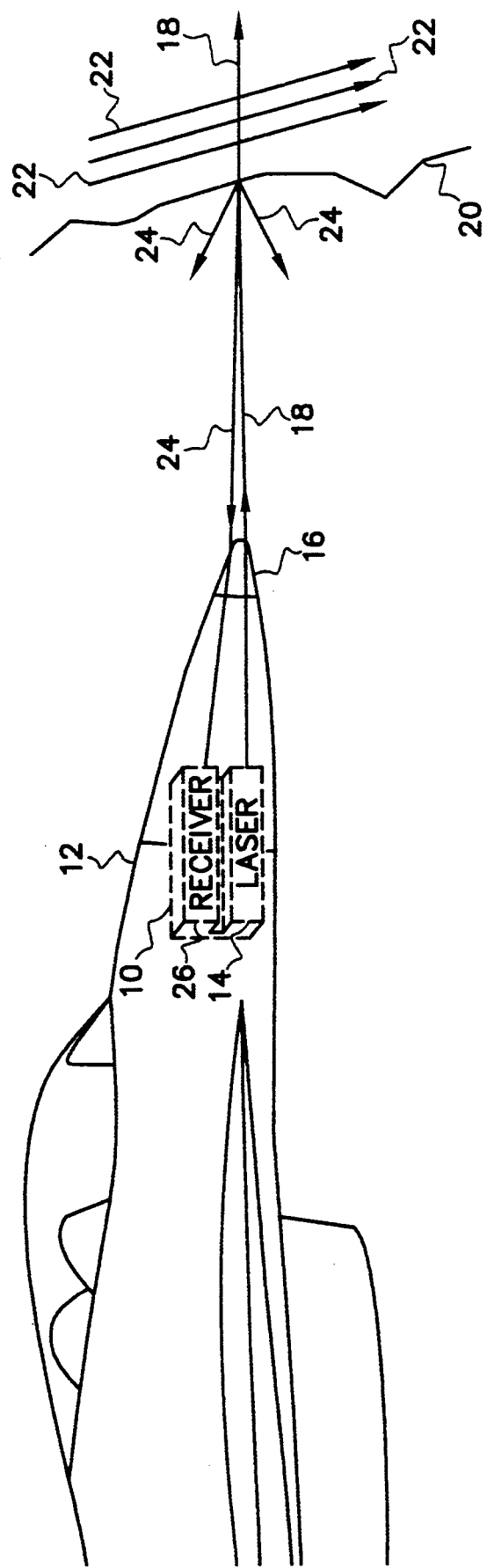

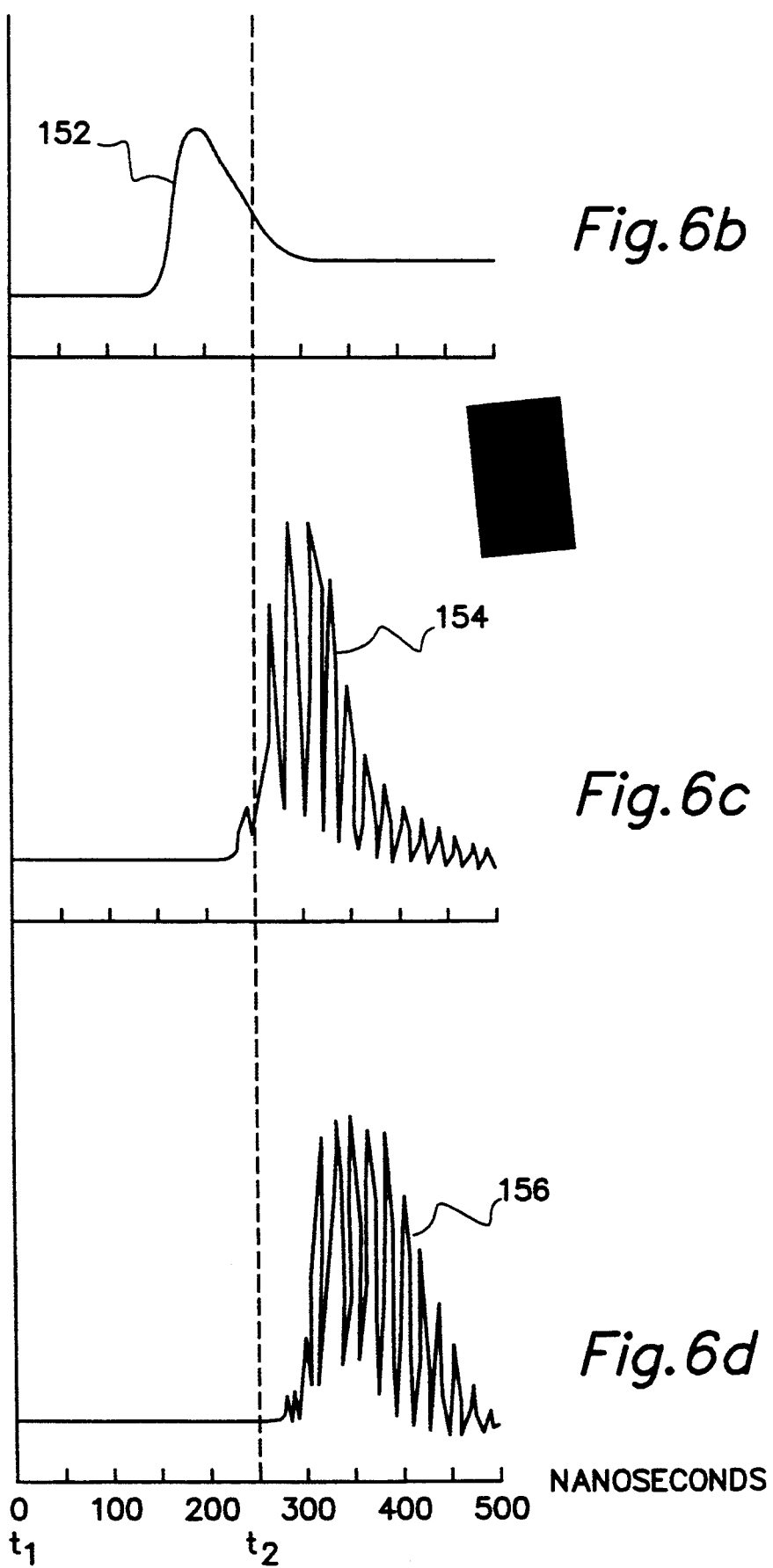

LOOK-AHEAD WINDSHEAR DETECTOR BY FILTERED RAYLEIGH AND/OR AEROSOL SCATTERED LIGHT

BACKGROUND OF THE INVENTION

The present invention pertains to aircraft windshear detection systems. It particularly refers to laser-based windshear detectors.

Some related art detectors have utilized the Doppler shift of light scattered by particulate matter (i.e., aerosols) dispersed in moving air. These Doppler sensors use either homodyne or heterodyne detection which requires a separate local oscillator and an interferometer. These sensors are sensitive to vibration and noise. The present invention does not require a heterodyne interferometer and separate local oscillator but a simple combination of a tunable laser and a filter. The invention makes use of backscatter from molecules (i.e., Rayleigh backscatter) and/or aerosol particles.

A technique using a transmission filter and a tunable laser has been disclosed in the related art. In this technique, the so called edge technique, a laser is placed at the edge of a transmission filter. A portion of the back-scattered light goes through the edge filter while another portion together with a reference signal falls on detector which is an energy monitor. The Doppler shift is determined from a differential measurement of the frequency of the outgoing laser pulse and the laser return backscattered from the atmosphere. This is accomplished by measuring the normalized edge filter output for both the outgoing and backscattered laser signals on a per pulse basis and taking the difference in these outputs. Disadvantages of this approach are: all the power must be generated in one laser that must have good tunability and resetability features that generally cannot be obtained from one laser; and the laser must have good long-term stability; otherwise different portions of the slope of the filter lead to different scale factors on the read-out.

SUMMARY OF THE INVENTION

The present invention specifically overcomes the shortcomings of the "edge" technique discussed above. Specifically, the following features are achieved. First, generation of the required coherent power is with an injection laser approach in which a high power unidirectional ring laser is locked in frequency to the injection laser, thus, resulting in high coherency at a high power level. This feature is accomplished with a detector and control electronics feeding back a signal to the PZT of the ring laser. The second feature is the locking of the injection laser to the molecular filter. The locking feature prevents long-term frequency shifts of the laser resulting in operation at different slopes of the bandpass curve of the molecular filter. Such operation could result in laser frequency drifts away from the molecular filter bandpass thereby rendering the non-locked approach useless.

The locking of the injection laser to the molecular filter is accomplished by alternately sampling a laser signal directly from the injection laser and sampling the same signal after it has passed through the molecular filter. No frequency dither need be applied to the laser. A detector with appropriate feedback to the piezoelectric (PZT) adjustable mirror of the injection laser keeps the laser tuned to the molecular filter. The third feature is the ratio-forming of both the high power laser (i.e., ring laser) transmitted output signal and the received (backscattered) signal directly and through the molecular filter. This ratio-forming adjustment makes the processing insensitive to backscatter fluctuations in the atmosphere and also eliminates pulse-to-pulse fluctuations of the transmitter laser. This adjustment is accomplished with outputs from two detectors to ratio-forming networks and a signal processing unit. The adjustment uses one molecular filter in two mutually orthogonal beam transmission directions. The molecular filter becomes the wavelength reference since both the injection laser and the high power ring laser are locked in frequency to the molecular filter.

The outgoing light of the windshear detection system is tuned to the frequency of a strong absorption or transmission filter placed in front of the detector. A transmission filter is preferred since it provides for a larger signal throughput at the center frequency. If operation at the edge ("edge-filter") is desired, either an absorption or transmission filter may be used. The present invention is preferably implemented with the transmission filter. In the absence of windshear, the laser source, emitting light into free-stream air, is tuned to a frequency wherein the scattered return from the free-stream air flowing by the aircraft containing the detector, has a wavelength wherein the transmission filter is filtering at a maximum and thus is most effective. At such wavelength, the detector receives maximum signal. However, when the laser light is scattered from air with a velocity different (i.e., windshear or turbulent pocket) from that of free-stream air, the frequency of the laser light has its frequency shifted to one that does not coincide with the center frequency of maximum transmission by the filter, and the signal received by the detector is now diminished, thus indicating an air disturbance.

Rayleigh scattering techniques of the present invention use pulsed or Q-switched lasers because of the high power requirements for accurate detection. In the related art, pulsed or Q-switched lasers are difficult to stabilize in frequency due to their short pulse width and the information about the frequency deviation being available only after the pulse has elapsed. In addition, large intra pulse chirping occurs due to the giant pulse build-up out of noise. The present invention solves these problems by sensing Rayleigh/aerosol scattering by frequency locking a continuous wave injection laser and a pulsed or Q-switched ring laser.

The locking is achieved by injecting a small but highly coherent laser into a large and high-powered unidirectional ring laser. The ring laser is Q-switched for generating relatively long and high peak power pulses which are effective for accurate Doppler measurements. One version of the invention uses an $Er^{3+}$:-glass ring laser which emits a relatively eyesafe 1.54 micron wavelength. The $Er^{3+}$:glass laser, emitting at 1.54 μm, yields the highest MPE (maximum permissible exposure) level according to the 1986 ANSI standard (Z136.1-1986). Another suitable source is the $Tm^{3+}$:YAG laser which, due to higher thermal conductivity of the base material, permits a higher pulse repetition rate.

Most solid-state lasers are homogeneously broadened which means that the gain-curve is uniformly depleted over the total fluorescent line width (in contrast to the "hole-burning" effect of inhomogeneously broadened gas lasers where the gain curve is only depleted in a narrow sector, i.e., a "hole" around the cavity mode position). If a homogeneously broadened laser is put in a ring configuration (traveling wave laser), the direction of oscillation could statistically fluctuate in a clockwise or counter-clockwise direction, depending on the conditions of spontaneous emission at the onset of the threshold condition when the gain equals loss. If a small laser is injected, for instance, in the clockwise direction, the total gain will be higher in the clockwise direction at threshold and the laser will oscillate in the clockwise direction. The unidirectional ring laser injection locking scheme incorporated in the present invention eliminates the isolator requirement. This locking scheme, along with diode lasers utilized for pumping (i.e., both the injection laser and the injected laser) along with Q-switching, permits pulse-rate frequencies in excessive of 10 KHz. A conventional solid-state laser which is flashtube pumped is limited to a pulse repetition of less than 100 Hz.

BRIEF DESCRIPTION OF THE DRAWINGS

FIG. 1 illustrates a primary application of the look-ahead windshear detector.

FIGS. 6a-d show waveforms and timing of signals in the injection-locked ring laser system.

DESCRIPTION OF THE PREFERRED EMBODIMENT

Figure 2A:
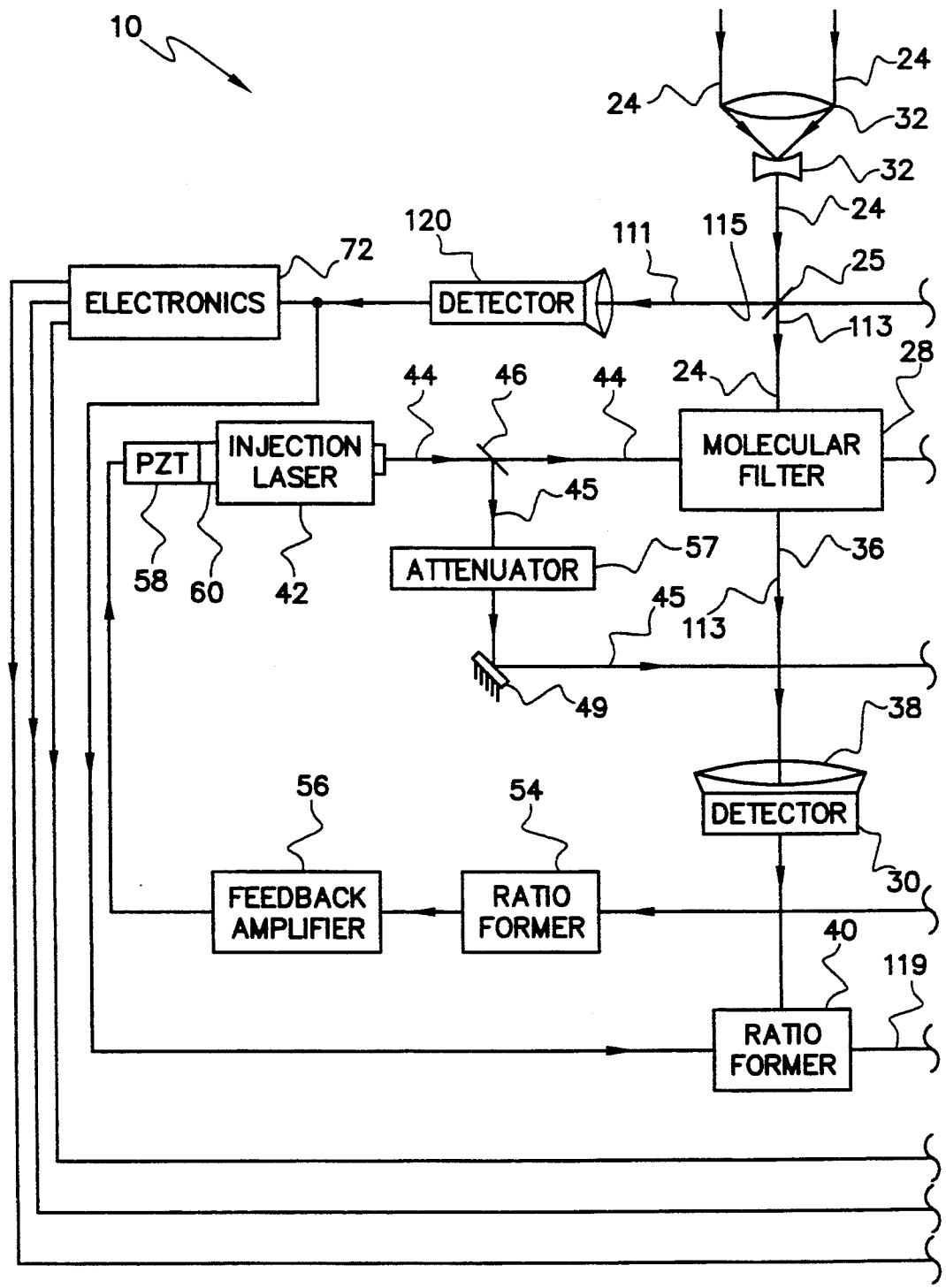
FIG. 2 is a diagram of the transmitter and receiver.

FIG. 1 illustrates an application of a system 10 as a look-ahead windshear detector for aircraft 12. Laser 14 sends out a laser beam or light signal 18 through window 16 in the nose of airplane 12. Laser beam signal 18 goes forth straight ahead of plane 12 and forms a Gaussian shaped volume of a focused beam for close-range detection or forms a cylinder-shaped volume of a collimated beam for preferred Rayleigh scattering 24. Backscattered radiation 24 is Doppler-shifted due to the relative motion of aircraft 12 and focusing volume, and may contain some broadening due to molecular or atomic velocity of molecules (Brownian motion). Some of this scattered light 24 is scattered towards receiver 26.

Figure 2B:
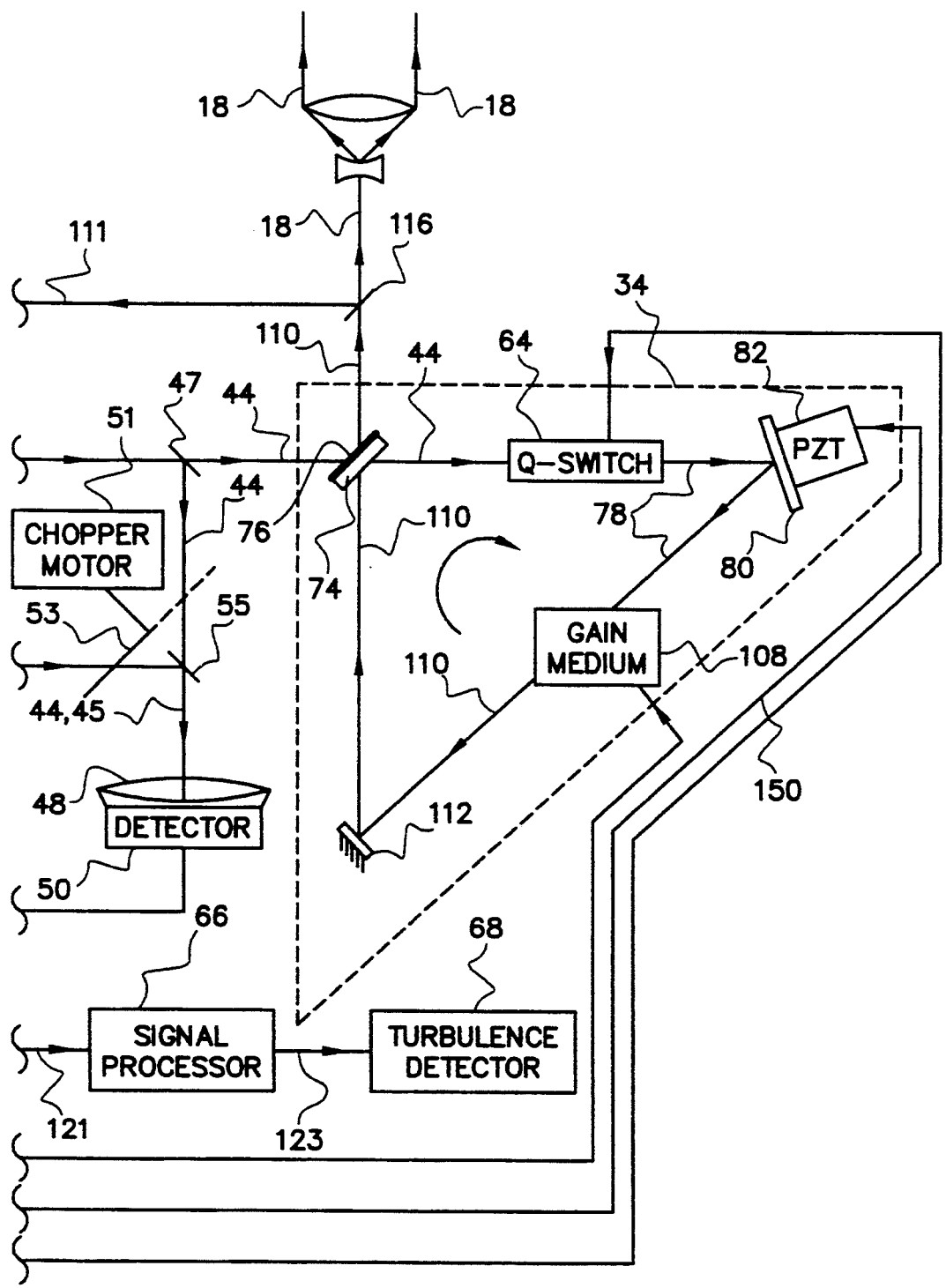

FIG. 2 is a diagram of windshear detector system 10. Light 24 passes through molecular (atomic) filter 28 of FIG. 2, and is focused as beam 36 on signal detector 30 via optics 38. If the Doppler shifted frequency coincides with the maximum of transmission filter 28, maximum radiation 24 will reach detector 30. If beam 18 enters a windshear zone 20, an additional Doppler component will arise and shift return signal 24 off the peak of the absorption or transmission, thus a reduced amount of photons from the shear wind zone 20 reaches detector 30.

Windshear boundary 20 results in Rayleigh scattered light 24. A beam of this light 24 may be received through receiving optics 32. Optics 32 may contain concave and convex lenses for focusing light beam 24 onto filter 28. Filter 28 may be a narrow band filter such as a molecular absorption or transmission line of a material such as barium atomic vapor, or the sharp transmission peak of an atomic resonance filter. In conjunction with this kind of transmission filter 28, laser 14 incorporates an $Er^{3+}$:glass ring laser 34 operating at 1.54 micrometers. There is greater eye safety with this laser because of the lower sensitivity of the eye to the 1.5 micrometer ($\mu$m) radiation since this wavelength does not reach the retina of the eye due to absorption of the radiation within the bulb of the eye. Other combinations of laser 34 and filter 28 are also possible. Light not filtered out by transmission filter 28 exits as beam 36 which goes through focusing lens 38, to a photodiode which is signal detector 30. Electronics and/or photoelectric detector 30 convert light signal 36 into an electrical signal which is fed on to a ratio forming network 40. The amount of light reaching detector 30 decreases or increases monotonically with the frequency shift which in turn decreases or increases monotonically with the relative wind velocity depending on the direction of the wind.

System 10 may be employed to produce an instantaneous two-dimensional map of wind velocities in front of the plane. In fact, in a simplified low-cost embodiment, the laser beam from laser 14 is simply directed ahead of aircraft 12. Detection of any signal by receiver 26 will indicate the presence of a change in wind or air velocity at any known point ahead or other direction of aircraft 12.

By using a narrow line width illuminator 14 and narrow molecular filter 28, molecular velocity changes may be detected by using a pulsed sensor system 10. The detected output 24 due to reflection or backscattering of a look-ahead laser or illuminator 14 emission 18 is designed to detect a given velocity dot product or velocity change, i.e., windshear. An addition of range gating, system 10 allows for determination of the distance between aircraft 12 and detected windshear 22, and the intensity or velocity of windshear 22. Also, incorporation of scanning capabilities in system 10 allow determination of the spatial dimensions of windshear 22.

Long term stabilization in locking of the emission frequency of laser 42 to filter 28 is achieved by system 10 of FIG. 2. Continuous injection laser 42 provides a beam 44 at high coherency (i.e., narrow linewidth) at a low power level of 50 to 100 milliwatts. Beam 44 goes onto beam splitter 46 where part of the intensity of beam 44 goes through molecular filter 28 and onto beam splitter 47 and then via beam splitter 55 and focusing optics 48 onto stabilization detector 50. The other part of beam 44 (reference beam 45) is reflected by beam splitter 46 through attenuator 57 and reflected by mirror 49 onto beam splitter 55 which reflects beam 45 through focusing optics 48 onto stabilization detector 50, which may be a photoelectric detector such as a photodiode. The injection laser 42 frequency is locked to the molecular (atomic) absorption or transmission line at the half-power point of the filter 28 transmission curve, by sending beam 44 through filter 28 and comparing it in intensity with the attenuated (3 db) reference beam 45. A chopper motor 51 drives a sector blade 53 through both beams 44 and 45 so that beam 44 from molecular filter 28 and reference beam 45 alternately impinge on detector 50. Detector 50 converts light signals 44 and 45 into an electrical signals which are fed onto a ratio forming network 54. Detector 50 provides an output which is a result of a comparison of the two signals from the two beams 44 and 45. Ratio forming network 54 develops a voltage which is either positive or negative depending on the deviation of the frequency of the injection laser reference beam 45 from the frequency of the half-power transmission of filtered beam 44. Network 54 sends the output through feedback amplifier 56 to a PZT-element 58 that supports mirror 60 of laser 42. PZT-element 58 adjusts mirror 60 according to its input signal to element 58, which in turn alters or sets the frequency of laser 42 so as to return the voltage output of network 54 to zero.

In this closed loop technique, beam 44 is compared in intensity against a reference beam 45 which is adjusted in intensity such that the ratio of beams 44 and 45 is equal to 1 if laser 42 oscillates at the half-power transmission point of molecular filter 28. Via feedback amplifier 56, a voltage is provided that locks the average frequency of injection laser 42 to the flank of the molecular filter 28 curve.

The signal to PZT element 58 is used to lock the frequency of laser 42 to the center of transmission filter 28 or preferentially to lock the frequency of laser 42 to the low or high frequency spectrum sides of the transmission curve of filter 28. In this manner, the conditions for measuring Doppler-shifted signal 24 from wind shear 22 can be optimized.

Detector 10 may operate in a multi-functional mode allowing to determine Doppler velocity from Doppler shift 106 for application to optical air data measurement (OADS) and ranging to windshear zone 20. A low power but highly coherent injection laser 42 is used to inject light beam 44 in a clockwise direction into a high power ring laser 34. For a homogeneously broadened gain medium 108 (Nd:Yag, Ruby, etc.), this will result in a unidirectional oscillation (in clockwise direction), thus eliminating feedback into injection laser 42. Injection laser 42 has a long-term stability that is much better than the filter halfwidth (i.e., a few hundred Megahertz) and can be set to the flank of the transmission bandpass curve of filter 28. Locking or control electronics 72 is used to lock the pulsed (Q-switched) cavity 34 in between pulses to injection laser 42.

Injection laser 42 provides a coherent signal 44 for injection into unidirectional ring laser 34. A technique for a pulsed or Q-switched laser 34 uses as a discriminant, the minimum build-up time of Q-switched pulse. In other words, build-up time is used as a discriminant for injection locking. If slave laser 34 is within the locking band of master oscillator 42, a clean pulse 152 results at the fastest build-up time in FIG. 6b which is the result of mode matched injection. Tuning slave laser 34 out of the locking region results in a slower build up and modulated pulses (modulated at the difference frequency between slave laser 34 and master modulator 42) as seen by waveform 154 in FIG. 6c which is the result of the injection. No injection results in further delay and higher frequency modulation as seen by waveform 156 in FIG. 6d.

Figure 3:
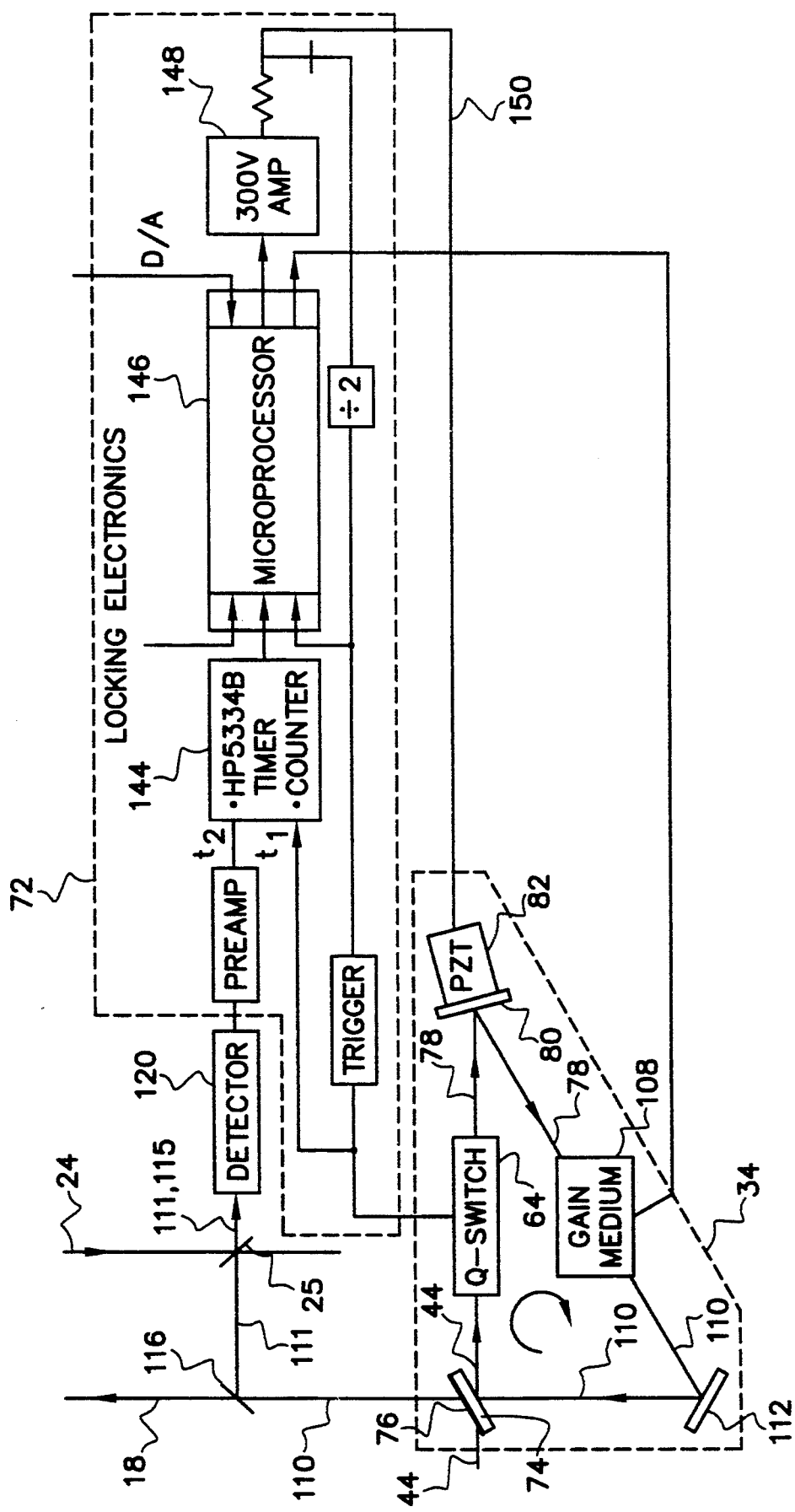
FIG. 3 is diagram of the ring laser and associated electronics.

FIG. 3 shows an injection locked unidirectional ring laser 34 and its associated electronics 72. Injection laser 42 emits a beam 44 having a linear polarization of P orientation. Beam 44 impinges glass slab 74 having a thickness from ⅛ to ½ of an inch. An anti-reflective coating 76 is on slab 74. Beam 44 is a continuous-wave laser beam. Beam 44 goes on through glass slab 74 and enters device 34 which is the essence of a unidirectional ring laser. Beam 44 enters Q-switch 64. Q-switch 64 is a type of electrooptic cell that provides a very low Q to laser beam 44, thereby in effect not passing on beam 78, while gain medium 108 is being diode-pumped. Pulse-wave beam 78, having a linear polarization of P orientation, exits Q-switch 64 and impinges and is reflected by mirror 80 which is situated on a piezoelectric support 82 which functions to move mirror 80 so as to tune ring laser 34. Beam 78 propagates through gain medium 108 after medium 108 is pumped, and then medium 108 emits a high power laser pulse beam 110 having a linear polarization of P orientation. Gain medium 108, piezoelectric movable mirror support 82, Q-switch 64 and detector 120 are connected to electronics 72 for appropriate implementation of unidirectional ring laser 34. Electronics 72 controls Q-switch 64 and gain medium 108 and their respective switching and activation times.

Figure 6A:
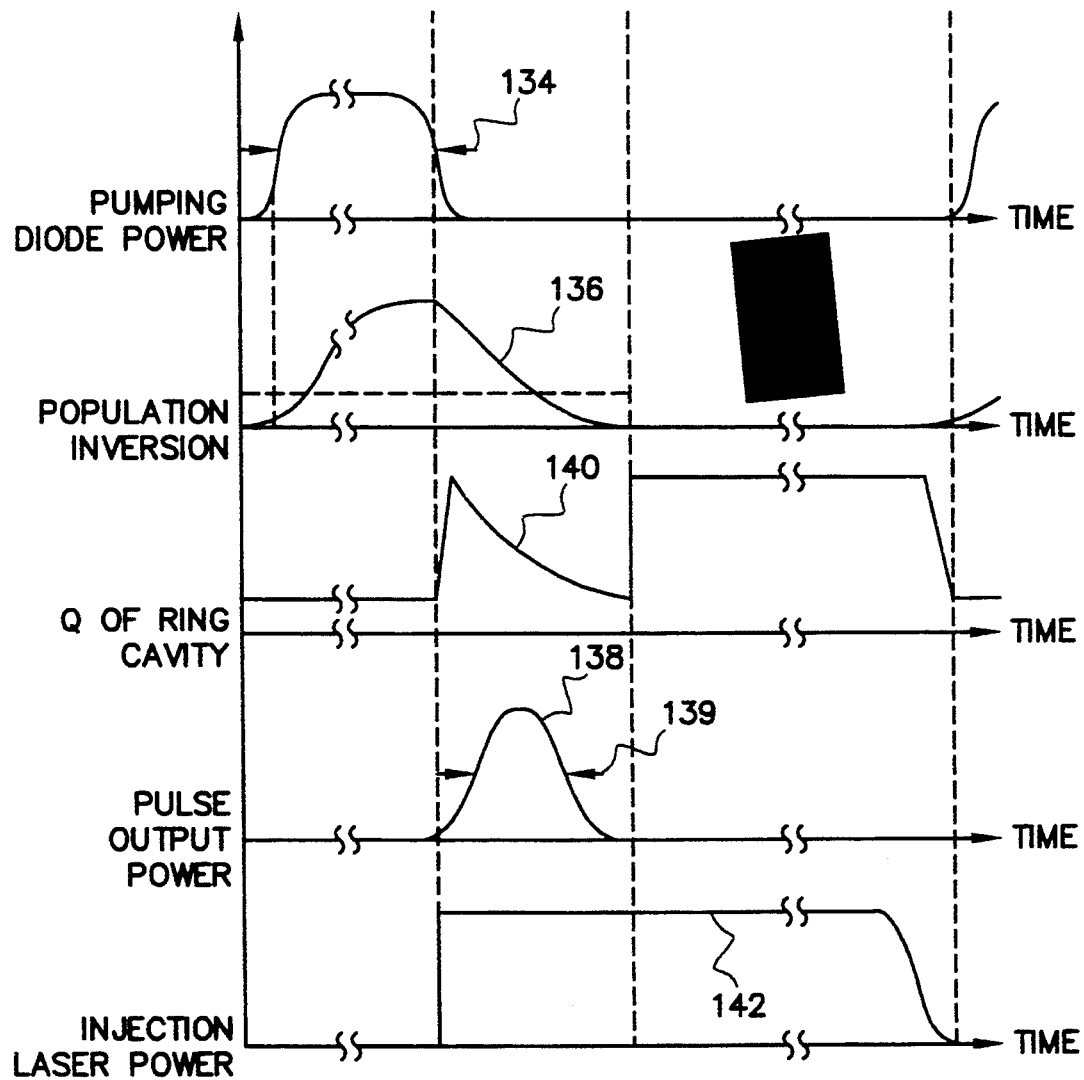

A digital implementation 72 uses build-up time to lock the frequency of slave laser beam 78 (of ring laser 34) to the frequency of local oscillator signal 44 (of master oscillator 42). In FIGS. 6a and 6b, pulse 138 at $t_1$ is synchronized to Q-switch 64 trigger 140 (start pulse) and fed to a timer/counter 144 (HP5334B), and the pulse at $t_2$ is derived from optical detector 120 (an Epitaxx ETX-75 InGaAs PIN diode) of laser pulse 138 (stop pulse) and likewise fed to timer/counter 144. The resultant number count is proportional to build-up time of pulse 152 and is sent to microprocessor 146 which is performing the averaging. After digital-to-analog conversion by processor 146 and amplification by amplifier 148, the signal on line 150 is fed back to PZT 82 of slave laser 34. PZT 82 is modulated at half of the laser 110 repetition rate so that alternately build-up time corresponding to a high-frequency gain and a low-frequency gain setting are sampled. From this, microprocessor 146 determines the shift direction for PZT element 82 and its attached mirror 80 to stay at the fastest (shortest) build-up time of laser pulse 110. This corresponds to the locking condition of slave laser beam 78 of slave laser 34 to master oscillator laser beam 44 of master laser 42.

Beam 110 from gain medium 108 impinges mirror 112 and is reflected to glass slab 74 at the area where original beam 44 entered ring laser 34. Beam 110 is partially reflected by splitter 116 through beam splitter 25 onto detector 120.

Figure 4:
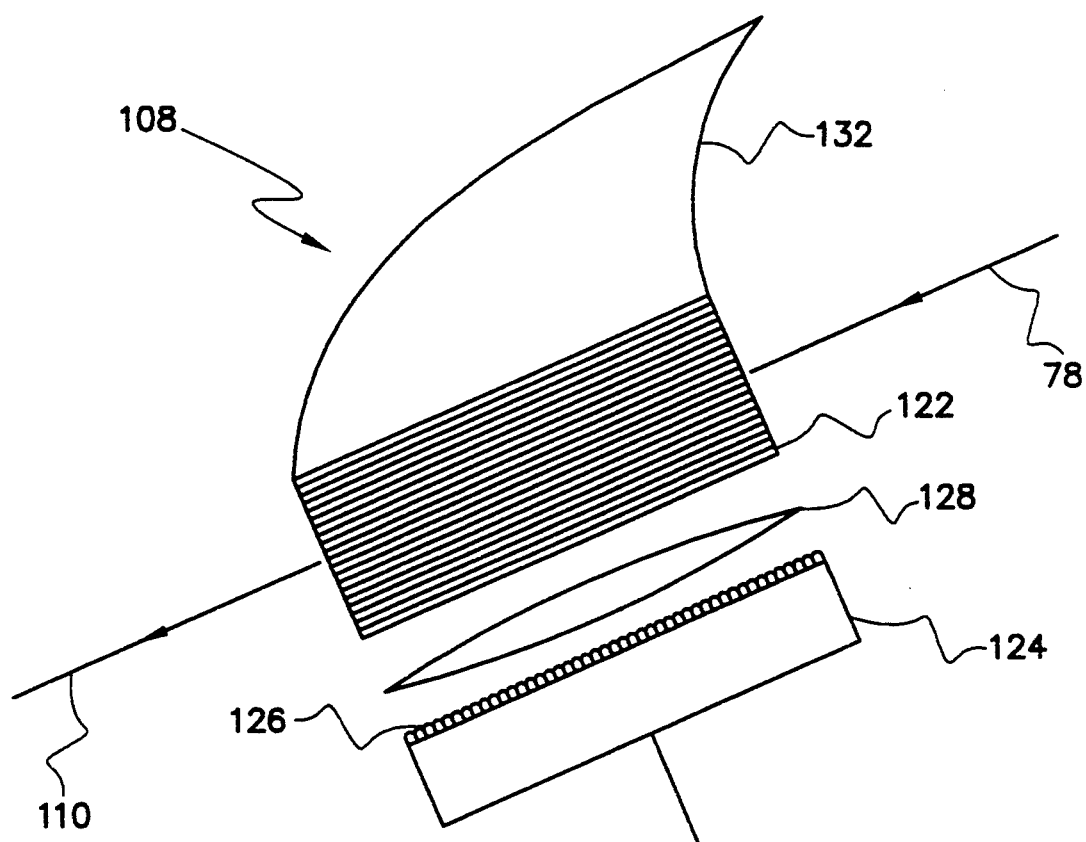
FIG. 4 illustrates the significant components of the gain medium.

Gain medium 108, which receives beam 78, is illustrated in FIG. 4 in a side-pumping configuration. Gain medium 108 has a crystal 122 which is diode-pumped by laser diode array 124 which provides monochromatic light for absorption in a narrow absorption band of crystal 122. Array 124 consists of a linear array of diodes 126 of, for instance, about 1000 diodes per centimeter connected in series. Between array 124 and crystal 122 there may be a cylindrical focusing lens 128. The substance of crystal 122 may be Nd:YAG for absorption at 808 nanometers, $Er^{3+}$:glass for absorption at 950 nanometers, or $Tm^{3+}$:YAG for absorption at 785 nanometers. Crystal 122 is diode-pumped which results in a population inversion wherein there are photons that are excited for an impending decay and photon emission to increase the power of the outgoing laser pulse 110 from the crystal 122 of gain medium 108. Attached to crystal 122 is a light absorber 132 which avoids standing wave reflection in the medium.

System 34 is designed to use a laser emitting at 1.54 $\mu$m which is in the eye-safe band of the spectrum. There are two approaches for achieving emission at 1.54 $\mu$m. One is Raman-shifting of a Nd:YAG laser emission (at 1.06 $\mu$m) by means of a high pressure ammonia cell (CH$_4$) to 1.54 μm. The other is an Er$^{3+}$:glass laser having emission at 1.54 μm. A main disadvantage of the Raman technique is the need of a high pressure (i.e., ~300 psi) ammonia cell which has limited life and reliability. The Er$^{3+}$:glass is the preferred choice. The Er$^{3+}$:glass laser has low atmospheric attenuation under clear and hazy conditions and under light and heavy rain in comparison to Nd:YAG (1.06 μm) and CO$_2$(10.6 μm). Powerful pumping diodes and arrays for InGaAs at 930 to 980 nanometers are starting to become commercially available.

Figure 5:
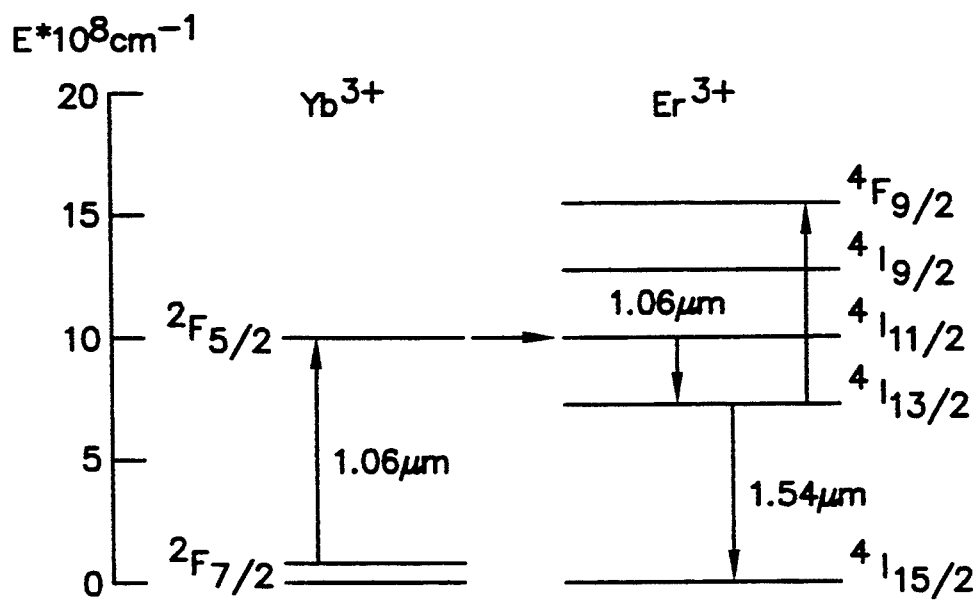
FIG. 5 is an energy level diagram of the $Yb^{3+}$, $Er^{3+}$ phosphate glass system.

FIG. 5 shows the energy level diagram of the Yb$^{3+}$, Er$^{3+}$:phosphate glass laser. Absorption of the optical pump radiation takes place via the $^2F_{7/2}-^2F_{5/2}$ transition in the trivalent 16 ion. This absorption is strong due to the typically large Yb concentration (~10$^{21}$ ions/cm$^3$). Once populated, the $^2F_{5/2}$ level transfers non-radiatively energy to the $^4I_{11/2}$ level of trivalent erbium. Once excited, the erbium can relax non-radiatively, via multi photon transitions, to the $^4I_{13/2}$ level which is the upper state of the laser transition terminating at the $^4I_{15/2}$ level with an emission at 1.54 μm. Temperature control requirements are minimal due to the wide absorption lines of Ytterbium doped Er$^{3+}$:glass (±10 nanometers) in contrast to Nd:YAG (±1 nanometer). The long life-time (~8 m sec) of the upper energy state of Er$^{3+}$ permits efficient Q-switched operation. Side pumping with strained layer InGaAs laser diode array technology has resulted in high efficiency and outputs in the order of 100 milliwatts. These diodes have a center wavelength of 950 nanometers which ideally suited for pumping the broadband $^2F_{7/2} \rightarrow ^3F_{5/2}$ transition of the energy levels in the Yb$^{3+}$ Er$^{3+}$ phosphate glass system. For diode array 124, a quasi-continuous wave diode array, model no. SDL-6230 from Spectra Diode Laboratories may be used.

FIG. 6a shows the timing sequence of laser 34 if a long pulse (i.e. 300-500 nanoseconds) is desired from a high gain medium. Within a 100-500 microsecond time period 134, population inversion is obtained by pumping Er$^{3+}$:glass slab 122 with 970 nanometer InGaAsP diode array 124. During this period, Q-switch 64 provides a low cavity Q resulting in no injected laser power 78. Once the population inversion 136 above threshold is achieved, a high cavity Q is permitted by Q-switch 64 and there is coherent injection 44 of seed laser 42. This results in stimulation of lasing in ring cavity 34. To achieve a long 250 nanosecond period 139 of pulse 138, Q-switch 64 is electronically adjusted over time (controlled cavity Q-reduction) as indicated by curve 140 in FIG. 6a. About 100 milliseconds 142 between diode pumping time 134 is used for frequency locking of ring cavity 34 to injection laser 42. Slave laser output 110 is locked to the frequency of injection laser 42. Prior to Q-switching by switch 64, Er$^{3+}$ gain medium 108 does not "see" injection laser beam 78 so as to achieve a high level of population inversion in medium 122. Upon the on-set of Q-switching action by switch 64, the frequency of laser beam 78 stimulates gain medium 122 to oscillate at the same frequency thereby causing cavity 34 frequency of beam 110 to be nearly identical to the frequency of laser beam 78 and, in turn, to the frequency of laser 42.

Even in the situation of a frequency lock of the pulsed (Q-switched) laser 34 to the injection laser 42, amplitude fluctuations of pulsed laser 34 and fluctuations in the backscatter coefficient can affect the accuracy of measurements. A portion 111 of the outgoing pulse 110 is reflected by beam splitter 116 and is sampled via laser output reference detector 120. A portion 113 of beam 111 is reflected by beam splitter 25 through molecular filter 28 onto signal detector 30. The ratio of the two values of beam portions 111 and 113 form a reference signal 119 from ratio-former 40. Back-scattered return signal 24 goes through filter 28 onto detector 30. A portion 115 of return signal 24 is reflected by beam splitter 25 to detector 120. A ratio signal 121 of signals 24 and 115 is provided by ratio former 40. In a processor 66, the ratio signals 119 and 121 are digitized and converted into normalized signal levels. Then a difference signal 123 is determined between ratio signal 119 of the outgoing pulse samples and ratio signal 121 of the pulse return samples which is proportional to the Doppler shift of backscattered return signal 24.

Figure 7:
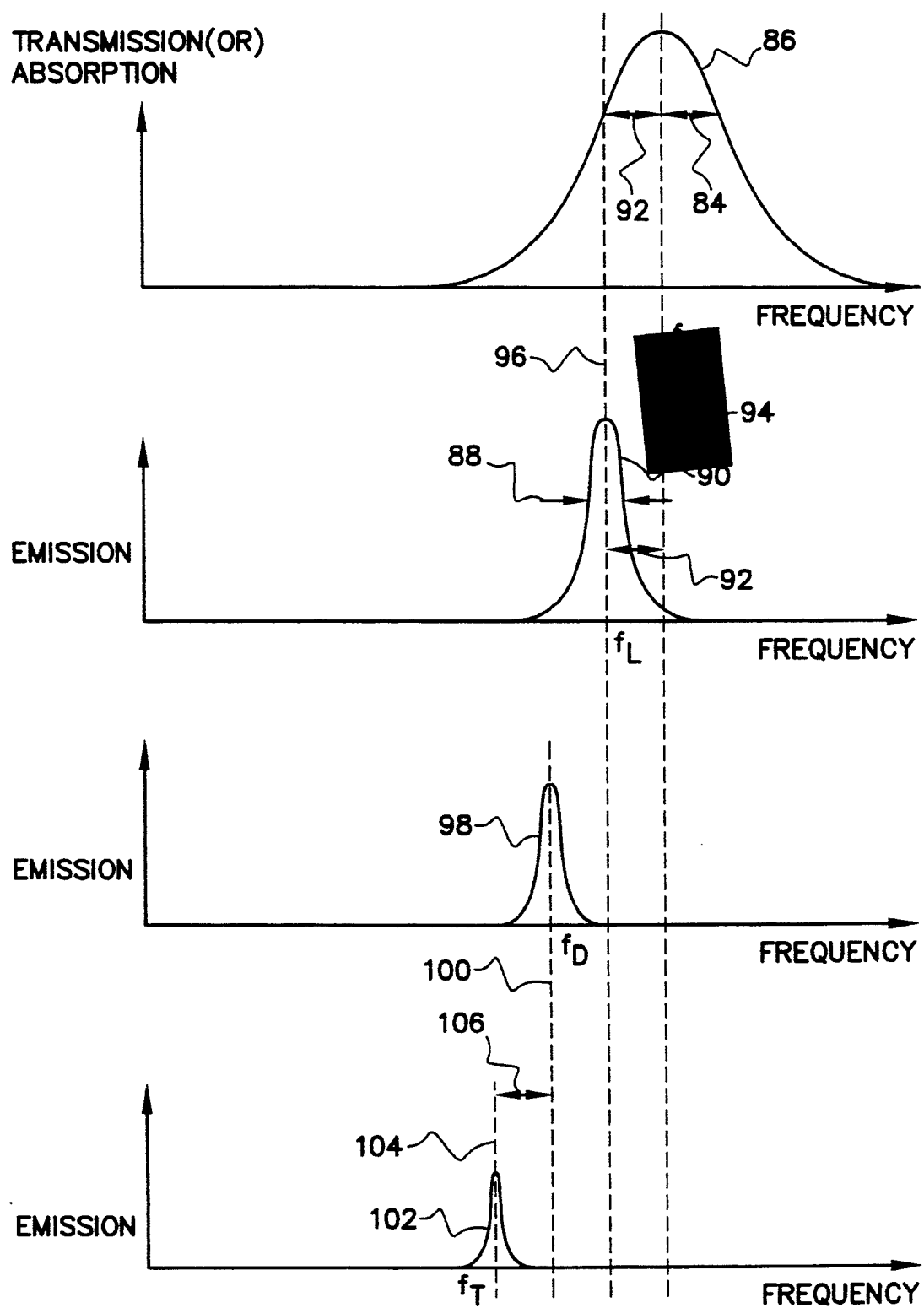
FIG. 7 shows the relationship among the laser bandwidth, the molecular absorption or transmission line and the Doppler shifts due to aircraft motion and windshear.

FIG. 7 reveals the criteria for the line width of laser 14 with respect to the molecular absorption or transmission line of filter 28. Depending on aircraft 12 velocity and the width of the absorption or transmission line, it may be preferable to place the frequency of laser 14 at the center or the edges of the absorption or transmission line frequency. Order of the magnitudes of the Doppler shift of aircraft 12 motion and windshear are indicated by indicator 68 as signals from detector 40 are processed by processor 66.

Also, FIG. 7 shows the relative positioning of laser 14 emission line with respect to molecular absorption or transmission filter line, and with respect to the Doppler frequency shifts caused by aircraft 12 motion through the air and by windshear. Half-width 84 of molecular (or atomic) absorption or transmission line 86 is about 10 gigahertz. Line width 88 of laser emission 90 must be small in comparison to absorption or transmission line 84 and is locked to its center frequency $f_o$ 94 with offset frequency $f_L$ 96 which is approximately 5 gigahertz for stabilization purposes. The backscattered return frequency from air molecules of the emitted laser frequency $f_L$ 96 is shifted by aircraft motion to Doppler frequency $f_D$ 100. A typical Doppler shift may be 400 MHz to 2 GHz if 1 micron radiation is being used. Waveform 102 at frequency $f_T$ 104 shows the frequency shift $f_D-f_T$ 106 due to windshear which is approximately 50 megahertz. A minimum detectable windshear is about 15 miles per hour which equates to 50 megahertz frequency shift. If a 50 megahertz shift is to be measured with a 10 percent accuracy then obviously the laser must have a short term (approximately 10 microsecond) stability of less than about 5 megahertz.

Although CW (continuous wave) lasers may be used for the detection process, it is preferable to use a pulse-coherent Doppler and ranging system 10 locked to filter 28 because range gating can be used to determine the range of aircraft 12 to shear wind zone 20, the average power for a pulsed system is lower, and also pumping diode arrays for solid-state lasers are limited to a duty cycle of 3-6% making a pulsed system more viable.

If a Doppler shift $f_D$ 100 due to aircraft 12 motion arises, it can be compensated for by moving the injection laser 42 frequency 96 of signal 44 to keep offset frequency $f_D$ 100 of the Doppler shifted return at the half-power point 84 of absorption or transmission curve 86 of filter 28. The round-trip path length of light 18 and 24 has a long time constant so that Doppler shifts 106 from a microburst 20 are readily detectable and not tracked out by the frequency tracker. Thus, filter 28 is at frequency reference $f_o$ 94 for system 10.

In case of no signal return (i.e., due to "clear air" at high altitude), injection laser 42 still controls ring laser frequency $f_L$ 96 by using a small signal reflected off of polarization beam splitter 116 (due to a small rotation) and comparing it with injection laser signal 44.

We claim:

1. A detection system comprising:
   unidirectional ring laser means for transmitting a first light beam having a first frequency; and
   receiver means for receiving a second light beam, the second light beam having some reflection or backscatter of the first light beam; wherein said receiver means comprises:
      filter means for receiving and filtering out a first portion of a second light beam having a second frequency and for passing a second portion of the second light beam having a third frequency;
      first signal detection means for receiving the second portion of the second light beam having the third frequency and for converting the second portion of the second light beam having the third frequency into a first electrical signal; and
      processing means, connected to said signal detection means, for processing the first electrical signal into information concerning windshear detection.

2. A detection system comprising:
   transmitter means for transmitting a first light beam having a first frequency, wherein said transmitter means is a unidirectional ring laser; and
   receiver means for receiving a second light beam, the second light beam having some reflection or backscatter of the first light beam; wherein said receiver means comprises:
      filter means for receiving and filtering out a first portion of a second light beam having a second frequency and for passing a second portion of the second light beam having a third frequency;
      first signal detection means for receiving the second portion of the second light beam having the third frequency and for converting the second portion of the second light beam having the third frequency into a first electrical signal; and
      processing means, connected to said signal detection means, for processing the first electrical signal into information concerning windshear detection.

3. Detection system of claim 2 further comprising:
   an injection laser; and
   locking electronics connected to said injection laser and to said unidirectional ring laser, for locking said unidirectional ring laser to said injection laser.

4. Detection system of claim 3 wherein:
   said injection laser emits a third light beam having a fourth frequency; and
   the third light beam partially passes through said filter means and exits as a fourth light beam having a fifth frequency.

5. Detection system of claim 4 further comprising:
   first extracting means for extracting a portion of the third light beam;
   second extracting means for extracting a portion of the fourth light beam;
   second signal detection means for receiving either portion of the third and fourth light beams;
   modulation means, situated in paths of the third and fourth light beams, for alternately passing the portions of the third and fourth light beams onto said second signal detection means wherein the portions of the third and fourth light beams are converted into second and third electrical signals, respectively;
   ratio means, connected to said modulation means, for receiving the second and third electrical signals to determine the ratio of the fourth and fifth frequencies of the third and fourth light beams, and for outputting a signal to said injection laser to vary the fourth frequency of the third light beam of said injection laser so as to keep the fourth frequency locked to a portion of a frequency bandpass curve of said filter.

6. Detection system of claim 3 wherein:
   said unidirectional ring laser is a pulse signal emitting transmitter;
   said filter means is an atomic or molecular line filter; and
   said injection laser is a continuous wave laser emitting device.

7. A detection system comprising:
   a transmitter;
   a receiver connected to said transmitter; and wherein:
      said receiver comprises:
         a line filter;
         a detector connected to said filter and to said transmitter; and
         a processor connected to said detector; and said transmitter comprises:
         a continuous wave laser having a frequency locked to said line filter; and
         a pulsed laser having a frequency locked to the frequency of said continuous wave laser.

8. Detection system of claim 7 wherein:
   said transmitter emits a pulsed laser beam;
   said receiver receives backscattered and reflected light of the pulsed laser beam;
   said line filter passes backscattered light and filters out other received light;
   said detector detects backscattered light and outputs electrical signals; and
   said processor receives signals, processes the signals and provides information relevant to windshear detection.

9. Detection system of claim 8 wherein:
   said pulsed laser is a unidirectional ring laser comprising:
      a Q-switch in a path of an output of the continuous wave laser;
      a gain medium in a path of an output of the Q-switch; and
      a plurality of mirrors for deflecting at least portions of outputs of the Q-switch, the gain medium and the continuous wave laser, respectively;
   said transmitter comprises locking electronics for locking the frequency of said pulsed laser to the frequency of said continuous wave laser; and
   said receiver comprises locking electronics for locking the frequency of said continuous wave laser to said line filter.

10. A detection system comprising:
    a first laser;
    first locking electronics connected to said first laser;
    a filter;
    detection electronics connected to said filter;
    a second laser; and
    second locking electronics connected to said filter and said second laser.

11. Detection system of claim 10 wherein:
said first laser is a pulsed laser;
said second laser is a continuous wave laser; and
said filter is an atomic or molecular line filter.

12. Detection system of claim 11 wherein:
said second laser is a tunable krypton fluoride laser; and
said filter is a barium atomic vapor filter.

13. Detection system of claim 11 wherein:
first locking electronics comprises:
- a first laser detector for detecting an output of said first laser;
- a timer/counter connected to said first laser detector; and
- a microprocessor connected to said timer/counter and to said first laser;

second locking electronics comprises:
- a light detector for detecting a first output from said second laser and a second output from said second laser wherein the second output is the first output that has passed through said filter;
- a first ratio-former connected to said light detector;
- a feedback amplifier connected to said first ratio former and to said second laser; and said detection electronics comprises:
- a signal detector for detecting reflected light after the reflected light has passed through said filter;
- a second ratio former connected to said signal detector and to said first locking electronics; and
- a processor connected to said second ratio former.

14. Detection system of claim 13 wherein said first laser is a unidirectional ring laser comprising:
- a beam splitter for passing light from said second laser after the output has passed through said filter;
- a Q-switch for alternately passing and blocking the light from said second laser and exiting pulsed light;
- a first mirror having a positioning device connected to said first locking electronics, the positioning device for adjusting a path length between said first mirror and said beam splitter, and said first mirror, for receiving pulsed light from said Q-switch and reflecting the pulsed light;
- a gain medium for receiving reflected pulsed light from said first mirror and amplifying the reflected pulsed light; and
- a second mirror for reflecting the amplified pulsed light on through said beam splitter to exit said first laser.

15. A detection system comprising:
- a ring laser for generating pulsed light at a first frequency;
- a filter for absorbing light near or at the first frequency of the pulsed light and for filtering the pulsed light which is reflected to said filter, and for passing certain backscattered light;
- a first light detector for receiving backscattered light from said filter;
- an injection laser for emitting laser light through said filter on into said ring laser;
- a second light detector for detecting laser light from said injection laser;
- a first ratio former connected to said second light detector and said injection laser; and
- a third light detector for receiving reflected pulsed light having backscatter and for receiving pulsed light from said ring laser;
- a second ratio former connected to said first light detector and to said third light detector;
- a signal processor connected to said second ratio former; and
- a turbulence indicator connected to said signal processor.

16. A detection system, for detecting windshear or turbulence in air or atmosphere external to said detection system, comprising:
- a ring laser for transmitting an emitted pulsed laser;
- an injection laser for injecting a continuous wave laser into said ring laser;
- a filter for receiving reflections of the pulsed laser and having a first filter output, and for receiving the continuous wave laser and having a second filter output;
- a first detector for receiving backscattered return of the emitted pulsed laser that has passed through said filter and receiving the emitted pulsed laser;
- a second detector for receiving the continuous wave laser from said injection laser and receiving the continuous wave laser that has passed through said filter;
- a third detector for receiving the backscattered return of the pulsed laser and receiving the emitted pulsed laser;
- a first ratio former, connected to said second detector and to said injection laser for forming a signal that indicates an amount of difference between a frequency of the continuous wave laser and a frequency of the second filter output;
- a second ratio former, connected to said first detector and to said third detector, for forming signals that indicate an amount of difference between a frequency of the emitted pulsed laser and a frequency of the first filter output;
- a processor and indicator connected to said second ratio former for processing signals from said second ratio former and indicating turbulence or windshear if the signals from said second ratio former represent such conditions impinged by the emitted pulsed laser; and
- electronics means, connected to said third detector and to said ring laser, for controlling said ring laser.

17. Detection system of claim 16 wherein said ring laser comprises:
- Q-switch means, connected to said electronics means, for receiving the continuous wave laser, and at certain times for blocking the passage of the continuous wave laser, thereby resulting in a pulsed laser;
- moveable mirror means, connected to said electronics means, for reflecting the pulsed laser from said Q-switch means, and for tuning said ring laser; and
- gain medium means, connected to said electronics means, for receiving the pulsed laser from said moveable mirror means, and for amplifying the pulsed laser into the emitted laser.

* * * * *